US012687153B2

(12) United States Patent
Luenenschloss et al.

(10) Patent No.: US 12,687,153 B2
(45) Date of Patent: Jul. 21, 2026

(54) METHOD AND SYSTEM FOR CONTROLLING WIND TURBINE ROTOR OSCILLATIONS

(71) Applicant: GE Vernova Renovables Espana, S.L., Barcelona (ES)

(72) Inventors: Alexander Luenenschloss, Hamburg (DE); Simone Schuler, Garching (DE); David Romanos, Barcelona (ES); Marc Guadayol Roig, Barcelona (ES); Till Hoffmann, Salzbergen (DE)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/282,365

(22) Filed: Jul. 28, 2025

(65) Prior Publication Data

US 2026/0028963 A1        Jan. 29, 2026

(30) Foreign Application Priority Data

Jul. 29, 2024    (EP) .................................... 24382830

(51) Int. Cl.
 *F03D 7/04* (2006.01)
 *F03D 7/02* (2006.01)
(52) U.S. Cl.
 CPC ........... *F03D 7/045* (2013.01); *F03D 7/0276* (2013.01); *F03D 7/028* (2013.01);
 (Continued)
(58) Field of Classification Search
 CPC ........ F03D 7/045; F03D 7/0276; F03D 7/028; F03D 7/298; F03D 17/015; F05B 2270/101; F05B 2270/1033; F05B 2270/331
 See application file for complete search history.

(56) References Cited

U.S. PATENT DOCUMENTS 6,525,518 B1 *    2/2003    Garnaes ................ F03D 7/0296
 73/579
7,004,724 B2    2/2006    Pierce et al.
 (Continued)

FOREIGN PATENT DOCUMENTS

DK        181379 B1    9/2023
WO    WO2023/025362 A1    3/2023
WO    WO2024/083294 A1    4/2024

OTHER PUBLICATIONS

European Search Report Corresponding to EP24382830 dated Jan. 3, 2025.

*Primary Examiner* — Nathaniel E Wiehe
*Assistant Examiner* — Maxime M Adjagbe
(74) *Attorney, Agent, or Firm* — Dority & Manning, P.A.

(57) ABSTRACT

The present disclosure relates to a method (100) of controlling operation of a wind turbine (10). The method (100) comprises receiving operational (215) data indicative of oscillations in a wind turbine rotor (18). The method (100) comprises deriving a first signal (224) representative of loads in a first direction in a reference plane and a second signal (226) representative of loads in a second direction in the reference plane. The second direction is different from the first direction. The method (100) further comprises determining an amplitude (A1, A2) of the first (224) and second (226) signals, as well as a phase offset ($\phi_1$-$\phi_2$) between the first (224) and second (226) signals. Finally, the method (100) comprises controlling the wind turbine (10) based on the amplitudes (A1, A2) and the phase offset ($\phi_1$-$\phi_2$). The disclosure also relates to a control unit (36) for controlling operation of a wind turbine (10) and to a wind turbine (10).

15 Claims, 5 Drawing Sheets

(52) U.S. Cl.
CPC . *F05B 2270/101* (2013.01); *F05B 2270/1033*
(2013.01); *F05B 2270/331* (2013.01)

(56) References Cited

U.S. PATENT DOCUMENTS

| | | | |
|---|---|---|---|
| 7,160,083 B2 | 1/2007 | Pierce et al. | |
| 7,322,794 B2 | 1/2008 | LeMieux et al. | |
| 7,854,589 B2 | 12/2010 | Nielsen et al. | |
| 2004/0151575 A1* | 8/2004 | Pierce .................... | F03D 17/00 |
| | | | 416/61 |
| 2018/0142676 A1 | 5/2018 | Pedersen | |
| 2019/0055923 A1* | 2/2019 | Caponetti .............. | F03D 7/042 |
| 2022/0268255 A1* | 8/2022 | Pinto Frutuoso ....... | F03D 17/00 |
| 2024/0247639 A1* | 7/2024 | Petersen ................ | H02K 7/183 |

* cited by examiner

100

| RECEIVING OPERATIONAL DATA | 110 |

| DERIVING A FIRST AND A SECOND SIGNAL REPRESENTATIVE OF LOADS IN A FIRST AND IN A SECOND DIRECTION | 120 |

| DETERMINING AN AMPLITUDE OF THE FIRST AND SECOND SIGNALS | 130 |

| DETERMINING A PHASE OFFSET BETWEEN THE FIRST AND SECOND SIGNALS | 140 |

| CONTROLLING THE WIND TURBINE BASED ON THE DETERMINED AMPLITUDES AND PHASE OFFSET | 150 |

200

224, 226          231          234, 236          251          252

210  215  220          230          240   A1, A2   250          260
                              $\phi_1 - \phi_2$

METHOD AND SYSTEM FOR CONTROLLING WIND TURBINE ROTOR OSCILLATIONS

The present disclosure relates to wind turbines, and more particularly, to methods and systems for controlling wind turbine rotor oscillations in wind turbines. The methods comprise using amplitude and phase information of at least two signals representative of loads acting on the wind turbine rotor.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through the use of a gearbox. This way, the generator produces electricity which can be supplied to the electrical grid.

The wind turbine hub may be rotatably coupled at the front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

Aeroelastic instability phenomena may occur due to the interaction of the elastic wind turbine components and the unsteady aerodynamic forces acting on them. In particular, there is a trend to make wind turbine blades increasingly longer to capture more energy from the wind, such wind energy being converted into electricity. This makes blades more flexible and more prone to oscillations or vibrations. Wind turbine blades vibrating excessively may get damaged. Furthermore, vibrations of the rotor blades may also result in the whole wind turbine structure oscillating, e.g. fore-aft oscillations, or sideways oscillations. Therefore, vibrations in the wind turbine blades may also damage other components of the wind turbine due to excessive stress and in general can increase the wear of wind turbine components.

Wind turbine blades may have different natural modes of oscillation, such as edgewise oscillation modes and flapwise oscillation modes. Edgewise oscillations occur along the chord of the blade and they tend to be poorly damped, whereas flapwise oscillations occur perpendicularly to the chord and they are typically more damped due to aerodynamic damping.

Wind turbine rotors typically comprise a plurality of blades. Accordingly, vibration modes can be classified based on the pattern of the vibrations exhibited by the multiple blades. On the one hand, collective modes may involve the entire wind turbine rotor and they may be characterized by synchronous vibration of the blades, i.e. all blades oscillating at the same phase and frequency. On the other hand, non-collective modes may arise when the rotor blades oscillate independently or out of phase with each other. In this case, the oscillations of the individual wind turbine blades are not synchronous.

When analyzing wind turbine behavior, one approach is the perturbation of the system to find eigenmodes and eigenfrequencies. Some of these system modes are typical for wind turbines with one subset of them being whirl modes. With whirl modes, the vibrations observed at each blade are not synchronized, but they are out of phase. A subset of these whirl modes are edgewise whirl modes. They are of interest for wind turbine design and operation because they show low aeroelastic damping. Because of this they are prone to higher response when being excited. They can lead to relevant loads for the turbine, especially at the blades. Edgewise whirl modes show approximately a first, second or higher order edgewise mode vibration as it would be observed in a single blade analysis. At the same time the different blades have their vibration peak at different times, being out of phase by either plus or minus 120 degrees for turbines with three blades. If the phase difference for a vibration peak shows up in the sequence of counting the blades counterclockwise, when looking at the rotor with the direction of the wind, the whirl mode is called a backward whirl. When the vibration peaks show up at blades in clockwise sequence, the mode is called a forward whirl. While the naming of the mode stems from vibrations observed at the blades, it should be clear, that these modes are still system modes, vibrations of the full wind turbine.

A sensor or a plurality of sensors, e.g. vibration sensors like accelerometers, are typically employed to monitor the wind turbine in real-time and to, directly or indirectly, detect the presence of oscillations. In particular, the magnitude or amplitude of the data captured by the sensors is fed to the wind turbine controller. In some cases, it is also known to filter data captured by the sensors, so that only specific frequencies, corresponding to certain oscillation modes, are considered.

When the wind turbine is in operation, i.e. producing energy, known methods to mitigate the effects of such oscillations comprise using a wind turbine controller to operate auxiliary drive systems, such as a pitch system or a yaw system, to reduce or change loads on the blades. This way, vibrations of the blades may be counteracted. In some cases, operation of the auxiliary drive systems may involve shutting down the wind turbine. In other cases, continued operation at reduced power output and/or reduced rotational speed may be enabled, thus reducing the negative economic impact of stopping operation.

Nevertheless, known methods exhibit some drawbacks or limitations. In particular, existing methods tend to generate a significant number of false positives and/or false negatives. A false positive is understood as a false detection of a potentially damaging oscillation when such oscillation is not really present or is actually insignificant. False positives result in unnecessary actions being taken by the wind turbine controller which, especially in situations comprising stopping of the wind turbine, result in significant energy yield losses. On the contrary, false negatives relate to those cases wherein a real, and significant, potentially damaging oscillation is not properly detected by the system. Such events can result in the controller not taking the appropriate safety measures which, in severe cases, can induce damage on the wind turbine blades or other wind turbine components.

The present disclosure seeks to provide improved methods and control units for controlling a wind turbine so as to reduce at least some of the aforementioned limitations.

SUMMARY

In an aspect of the present disclosure, a method of controlling operation of a wind turbine is provided. The method comprises receiving operational data indicative of oscillations in a wind turbine rotor. The method also comprises deriving, from the operational data indicative of oscillations in the wind turbine rotor, a first signal representative of loads in a first direction in a reference place and a second signal representative of loads in a second direction in the reference place. The second direction is different from the first direction and the reference plane substantially corresponds to a wind turbine rotor plane, or it is substantially parallel to the wind turbine rotor plane. Furthermore, the method comprises determining an amplitude of the first and second signals, as well as determining a phase offset between the first and second signals. The wind turbine is controlled based at least partially on the determined amplitudes and the determined phase offset.

According to this aspect of the disclosure, a method is provided which allows an improved control of a wind turbine. The received operational data may comprise different types of data in different examples of the disclosure. Thus, operational data may comprise one or more of the following: deformations, accelerations, moments, electrical parameters, etc. Such operational data are indicative of oscillations in the wind turbine rotor. In that sense, operational data indicative of oscillations is understood as any operational data affected by the presence of such oscillations. Accordingly, the first and the second signals, which are derived from the operational data, do also exhibit an oscillatory nature from which parameters like amplitude, frequency or phase can be determined. As in the case of the operation data, the first and second signals are representative of loads, which means that they are affected by the presence of loads. Nevertheless, this does not mean that the signals themselves correspond to forces or moments. Thus, others signals, such as deformations or electrical currents, which are also affected by loads, may be employed.

In some examples, deriving the first signal and the second signal from the operational data may simply comprise selecting some data out of a plurality of received operational data. In some other examples, deriving the first signal and the second signal may comprise processing the received operational data to, e.g. normalize or transform data to a different system of reference.

Furthermore, in order to obtain more information on the behavior of the wind turbine, such first and second signals are referred to different directions. In some, non-limiting examples, the first and second directions may be orthogonal to each other. In other examples, other relative orientations may be selected between the two directions.

By using more than one signal, an improved control of the wind turbine may be achieved. Hence, not only absolute amplitude or phase values of a single signal may be determined, but also offsets between different signals may be employed. Such information results in an enhanced characterization of the oscillations propagating in the wind turbine rotor. In particular, and as shown in more detail below, the method according to the present aspect of the disclosure may allow a better real-time detection and identification of the dominant oscillation mode in a wind turbine. The appropriate determination of the dominant oscillation mode permits an improved control reaction, which can be adjusted to the identified dominant oscillation mode. Thus, particularly dangerous oscillation modes can be distinguished from less damaging oscillations, so that an informed decision can be taken when controlling the wind turbine to decide if, e.g., a change in the operation point is convenient, or if the wind turbine can continue operating normally.

In some examples, the method according to this aspect may be used in an operating wind turbine, i.e. in a wind turbine that is generating power. In other examples, the method may be applied in a rotating wind turbine while in idling conditions. In still other examples, the method may be used while the wind turbine is at stand-still or parked situation.

In the prior-art, it is known to use sensors to obtain different operational parameters of the wind turbine, and to detect the presence of abnormal vibrations by, e.g. comparing the amplitude of measured signals with some predetermined thresholds. If such abnormal vibrations are detected, the operating point of the wind turbine can be changed. Nevertheless, inventors have found that this prior-art approach, in some cases, leads to false positive events and/or false negative events. Indeed, existing methods can result in the triggering of an action affecting the operating point of the wind turbine, even when the detected vibration does not pose a significant risk to the continued operation of the wine turbine. Furthermore, the mere use of vibration amplitudes is also prone to errors arising from noise in the measurements. Accordingly, a relatively large number of false positives occur which negatively impact the energy yield of the wind turbine by unnecessarily limiting its performance.

In still other examples of the prior-art, too conservative thresholds may be defined for the vibrations, which also results in a large number of actions involving stopping operation of the wind turbine or operating at de-rated conditions. By providing a proper identification of the dominant oscillation modes in the wind turbine rotor, the present disclosure allows a more informed response, which reduces the number of false positives.

On the other hand, the enhanced information obtained with the present disclosure results in a reduced number of false negatives. False negatives correspond to those situations in which an actually dangerous oscillation is present in the system but not detected. Such false negatives can result in severe damage on the wind turbine and, more specifically, on the blades of the wind turbine rotor. By not relying solely on the amplitude or phase of a single signal, but considering phase offset between signals, a better characterization and understanding of the prevailing modes is achieved, which results in a reduced number of false negatives.

In another aspect of the disclosure, a method for detecting and identifying a specific wind turbine rotor oscillation mode is provided. The method comprises receiving operational data indicative of oscillations in a wind turbine rotor. The method further comprises deriving, from the operational data, a first signal representative of loads in a first direction in a reference plane and a second signal representative of loads in a second direction in the reference plane. The second direction is different from the first direction and the reference plane substantially corresponds to a wind turbine rotor plane or is substantially parallel to the wind turbine rotor plane. Besides, the method according to this aspect of the disclosure comprises determining an amplitude of the first and second signals, and determining a phase offset between the first and second signals. Thresholds are predefined for the amplitudes of the first signal and the second signal. Furthermore, a band is predefined for the phase offset. The determined amplitudes are compared with the predefined thresholds and the determined offset is compared with the predefined offset band.

The comparison is employed to identify a prevailing wind turbine rotor oscillation mode. To this end, the frequency of the detected oscillations may be taken into account. The identification of the rotor oscillation mode may facilitate a more effective response to mitigate the effects of the oscillation and, more particularly, to limit further excitation.

In another aspect of the disclosure, a control unit for controlling operation of a wind turbine is provided. The control unit is configured for receiving operational data indicative of oscillations in a wind turbine rotor. The control unit is also configured for deriving, from the operational data indicative of oscillations in a wind turbine rotor, a first signal representative of loads in a first direction in a reference plane, and a second signal representative of loads in a second direction in the reference plane. The second direction is different from the first direction and the reference plane substantially corresponds to a wind turbine rotor plane, or is substantially parallel to the wind turbine rotor plane. The control unit is further configured for determining an amplitude of the first and second signals and for determining a phase offset between the first and second signals. The control unit is then configured for controlling the wind turbine based, at least partially, on the determined amplitudes and the determined phase offset.

According to this aspect of the disclosure, a control unit or control system is provided which can be arranged in a wind turbine. The control unit comprises the hardware and/or software and/or firmware needed to implement a method according to the previously described aspect. Consequently, the control unit allows the practical exploitation of the already mentioned advantages, which arise from the improved analysis of the oscillation of the wind turbine rotor. Specifically, from the analysis allowing the detection and identification of dominant oscillation modes. The method may be applied to an operating wind turbine, i.e. a wind turbine that is generating power. Accordingly, the control unit is designed to receive operational data in real-time and to process the information so that controlling of the wind turbine can be carried out online. Besides, the method may also be applied when the wind turbine is rotating while in idling, i.e. not generating power. Still in other examples, the method may be applied to handle certain stand still modes while the wind turbine is in a parked condition.

In still a further aspect of the disclosure, a wind turbine is provided. The wind turbine comprises a wind turbine rotor, one or more sensors to detect operational data indicative of oscillations in the wind turbine rotor, an electrical generator, and a control unit for controlling the wind turbine. The control unit is configured for receiving the operational data. The control unit is also configured for deriving, from the operational data, a first signal representative of loads in a first direction in a reference plane and a second signal representative of loads in a second direction in the reference plane. The second direction is different from the first direction and the reference plane substantially corresponds to a wind turbine rotor plane or is substantially parallel to the wind turbine rotor plane. The control unit is further configured for determining an amplitude of the first and second signals and for determining a phase offset between the first and second signals. The control unit is then configured for controlling the wind turbine based at least partially on the determined amplitudes and the determined phase offset.

According to this further aspect of the disclosure, a wind turbine with enhanced performance, and/or a wind turbine with a more optimized design, is provided. Thus, a wind turbine according to this aspect of the disclosure benefits from an improved understanding and classification of the oscillations suffered by the wind turbine rotor. Accordingly, a more effective response can be implemented, which translates in less energy losses arising from, e.g. unnecessary stopping, or unnecessary de-rating. Furthermore, such improved classification of prevailing wind turbine rotor oscillations results in increased safety of the wind turbine, as early detection of dangerous events is also achieved.

Besides, the benefits of the disclosure may also be seen during the design phase of the wind turbine. In particular, the improved understanding of the vibrations withstood by the structure during wind turbine operation can be used to design optimized in terms of weight, i.e. less conservative, components. This results in a more competitive design, and eventually, in a reduced cost of the generated energy.

BRIEF DESCRIPTION OF THE DRAWINGS

Non-limiting examples of the present disclosure will be described in the following, with reference to the drawings, in which.

DETAILED DESCRIPTION OF EXAMPLES

Figure 1:
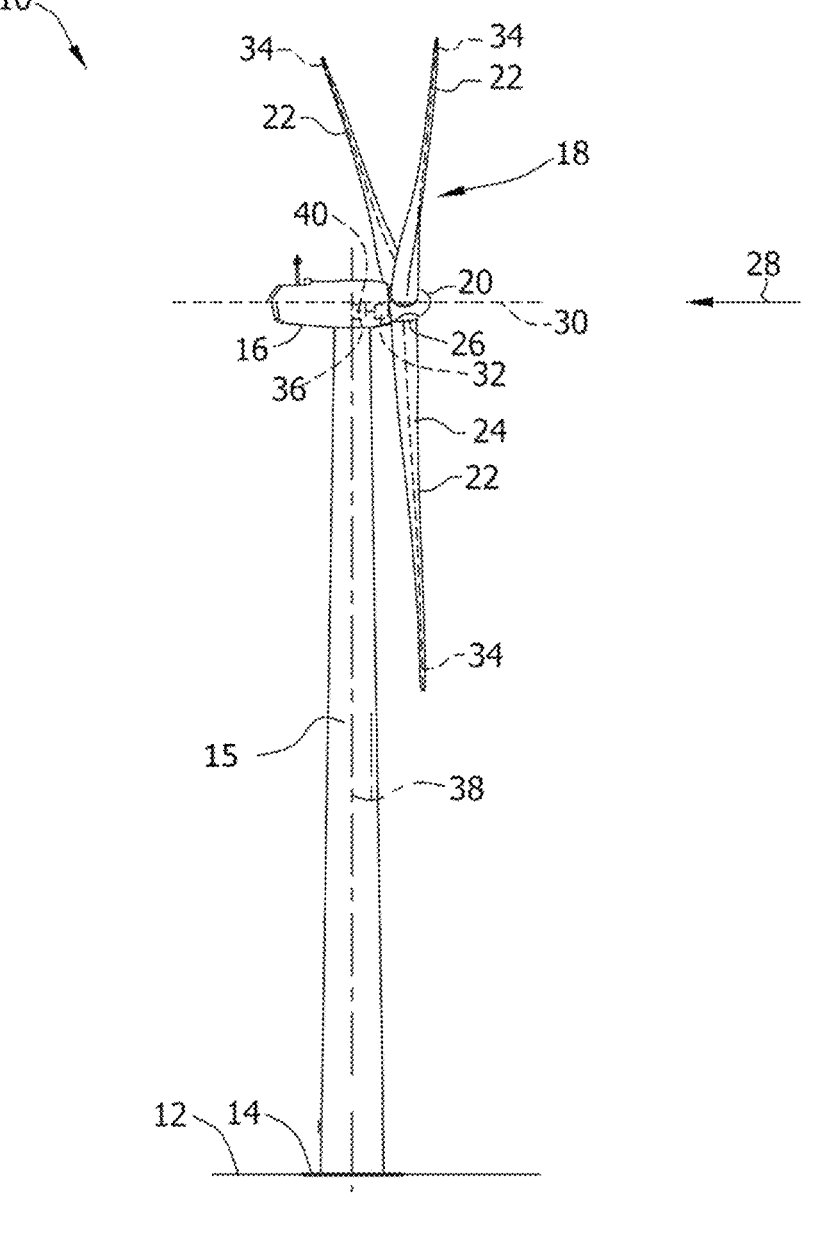
FIG. 1 illustrates a perspective view of one example of a wind turbine.

Reference now will be made in detail to embodiments, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one example can be used with another example to yield a still further example. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative example, the rotor 18 includes more or less than three rotor blades 22. The tower 15 may be fabricated from tubular steel to define a cavity (not shown in FIG. 1) between a support system 14 and the nacelle 16. In an alternative example, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root area 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power output of the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a nacelle 16 may be rotated about the longitudinal axis of the tower, i.e. about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 may include a processor 40 configured to perform some of the methods and/or steps described herein. Further, many of the other components described herein include a processor.

As used herein, the term "processor" is not limited to integrated circuits referred to in the art as a computer, but broadly refers to a controller, a microcontroller, a micro-computer, a programmable logic controller (PLC), an application specific, integrated circuit, and other programmable circuits, and these terms are used interchangeably herein. It should be understood that a processor and/or a control system can also include memory, input channels, and/or output channels.

A control system 36 may also include a memory, e.g. one or more memory devices. A memory may comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s) 40, configure the controller 36 to perform, or trigger the performance of, various steps disclosed herein. A memory may also be configured to store data, e.g. from measurements and/or calculations.

Figure 2:
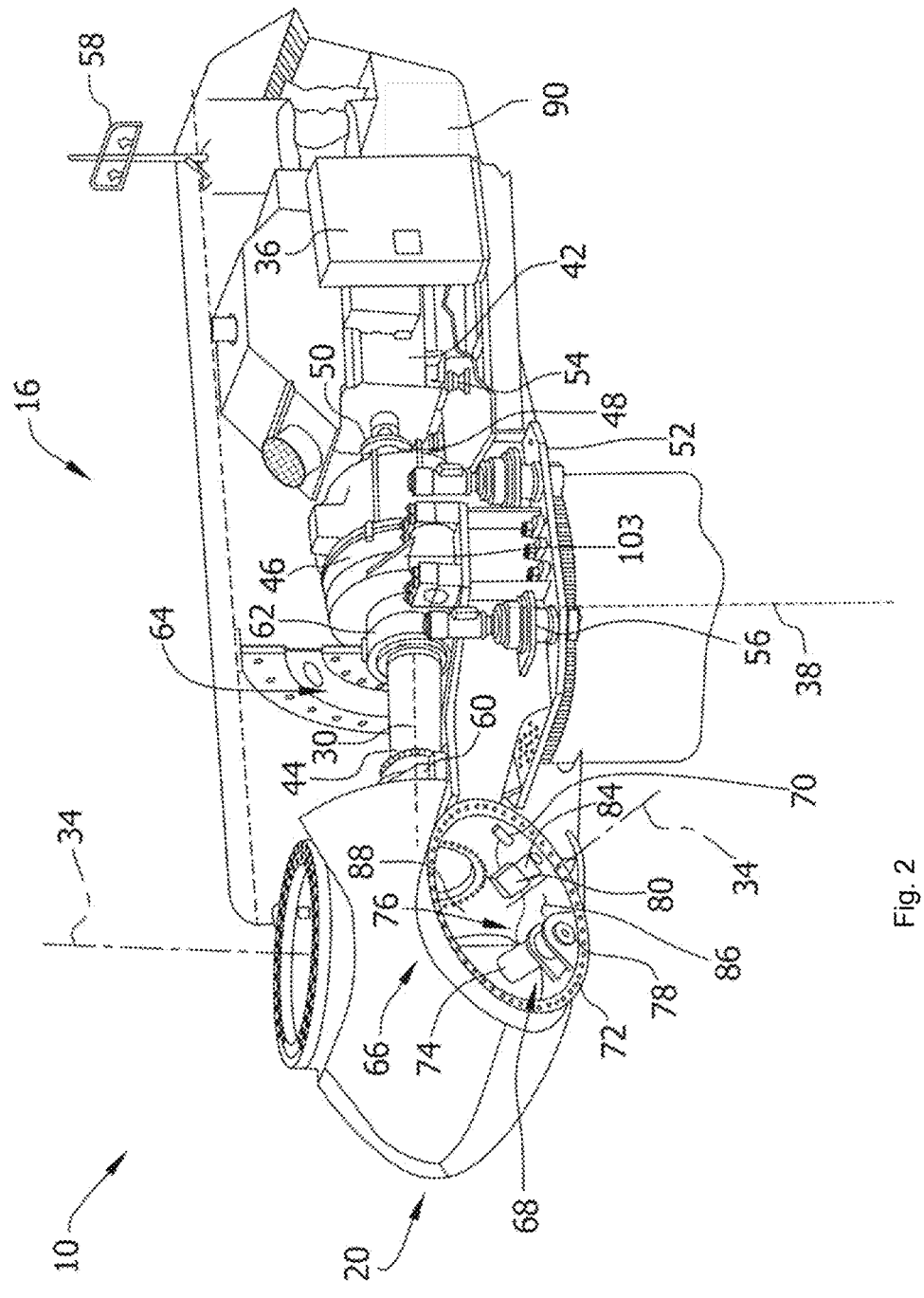
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (e.g. 10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 55. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high-speed shaft 48, coupling 50, and any associated fastening, support, and/or securing device including, but not limited to, support frame 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw system which comprises a yaw bearing (not visible in FIG. 2) having two bearing components configured to rotate with respect to the other. The tower 15 is coupled to one of the bearing components and the bedplate or support frame 52 of the nacelle 16 is coupled to the other bearing component.

The yaw system may comprise an annular gear 31 and a yaw drive mechanism 56 that may be used to rotate the nacelle 16 and thereby also the rotor 18 about the longitudinal axis of the tower, i.e. about a yaw axis 38 to control the perspective of the rotor blades 22 with respect to the wind direction 28.

The yaw drive mechanism 56 may comprise a plurality of yaw drives 35 with a motor 33, a gearbox 37 and a pinion 39 for meshing with the annular gear 31 for rotating one of the bearing components with respect to the other. The annular gear 31 may comprise a plurality of teeth which engage with the teeth of the pinion 39. In the example of FIG. 2, the yaw drives 35 and the annular gear 31 are placed outside the external diameter of the tower. The teeth of the annular gear are outwardly orientated, but in other examples, the annular gear and yaw drives may be arranged at the inside of the tower.

In some examples, one of the yaw drives may be a "master", and the other drives may be "slaves" following the instructions of the master or adapting their operation to adapt to the master drive.

The wind turbine controller 36 may be communicatively coupled to the yaw drive mechanism 56 of the wind turbine 10 for controlling and/or altering the yaw direction of the nacelle 16 relative to the wind direction 28. As the direction of the wind 28 changes, the wind turbine controller 36 may be configured to control a yaw angle of the nacelle 16 about the longitudinal axis of the tower or yaw axis 38 to position the rotor blades 22, and therefore the rotor 18, with respect to the wind direction 28, thereby controlling the loads acting on the wind turbine 10. For example, the wind turbine controller 36 may be configured to transmit control signals or commands to the yaw drive mechanism 56 of the wind turbine 10, via a yaw controller or direct transmission, such that the nacelle 16 may be rotated about the longitudinal axis of the tower or yaw axis 38 via a yaw bearing.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed.

In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain examples, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an example, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative example, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative example, said components are positioned with respect to an outer surface of hub 20 and may be coupled, directly or indirectly, to the outer surface.

Figure 3:
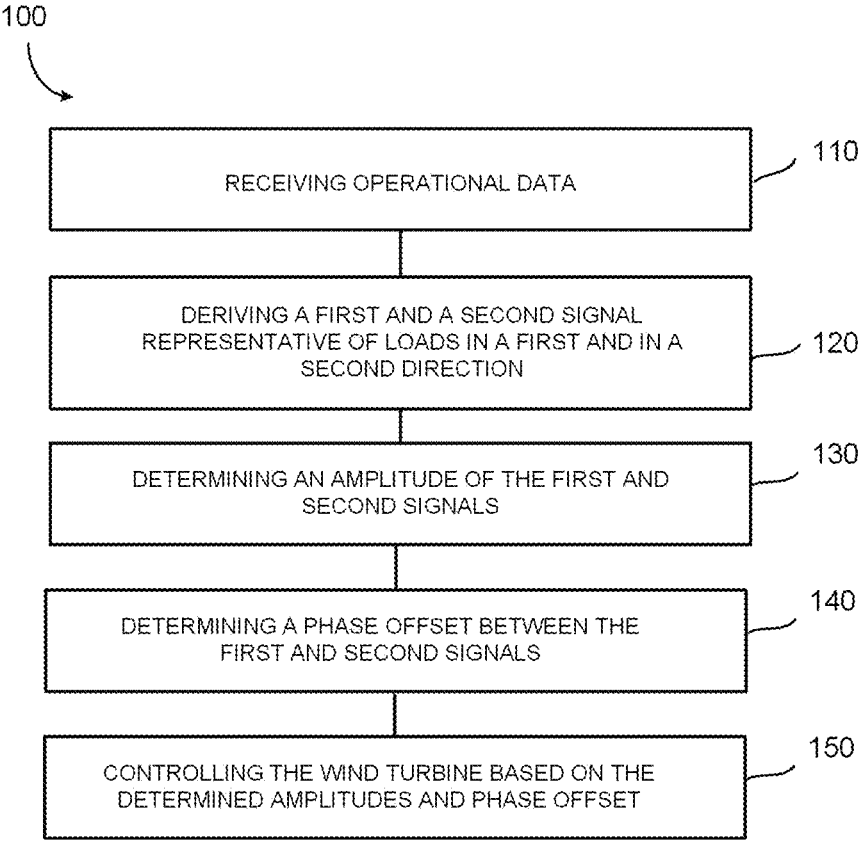
FIG. 3 shows a flowchart of an example of a method for controlling operation of a wind turbine.

FIG. 3 shows a flowchart of an example of a method 100 for controlling operation of a wind turbine 10. Block 110 of the method 100 comprises receiving operational data, the operational data being indicative of oscillations in a wind turbine rotor 18. Block 120 of the method 100 comprises deriving, from the operational data indicative of oscillations in the wind turbine rotor 18, a first signal representative of loads in a first direction in a reference plane. Block 120 also comprises deriving a second signal representative of loads in a second direction in the reference plane. The second direction is different from the first direction and the reference plane substantially corresponds to a wind turbine rotor 18 plane, or is substantially parallel to the wind turbine rotor 18 plane. Subsequently, in block 130, the method 100 comprises determining an amplitude of the first and second signals, as well as a phase offset between the first and second signals. Then, block 150 comprises controlling the wind turbine 10 based at least partially on the determined amplitudes and the determined phase offset.

According to this method 100, an improved control of a wind turbine 10 is provided. The operational data indicative of oscillations in a wind turbine rotor 18 may be obtained with different sensors and measurement systems. In particular, it is not necessary for the sensors or measurement system to be arranged in the wind turbine rotor 18 itself. Thus, the effects of oscillations in the wind turbine rotor 18 may also be detected by placing a sensing system in other locations, e.g. in the nacelle 16, shaft 44 or tower 15 of the wind turbine 10. The sensing system may also be arranged in the wind turbine rotor 18, i.e. at the hub 20 or at the blades 22.

The operational data are indicative of oscillations, so they also exhibit an oscillatory behavior. Similarly, first and second signals, which are derived from such operational data, also exhibit an oscillatory or vibratory behavior. Accordingly, certain parameters, such as the amplitude and the phase, can be used to characterize the mentioned signals.

By using more than a single signal, and by using not only amplitude but also phase information (and particularly the phase offset between the two signals), an improved understanding of the oscillatory behavior obtained at the wind turbine rotor 18 is provided. Therefore, a more informed decision can be made regarding real-time controlling of the wind turbine 10. In particular, the method 100 may be applied to an operating wind turbine 10, i.e. a wind turbine 10 that is not at stand-still or in idling mode, but generating power. Under such operational conditions, an improved control of the wind turbine 10 may be desired to optimize energy yield while satisfying safety constraints related to, e.g. structural limits of the components of the wind turbine 10. Alternatively, the method 100 may be applied to a rotating wind turbine 100 while in idling mode, i.e. not producing power, or to a wind turbine at stand still.

In examples of the disclosure, the wind turbine 10 may comprise a plurality of actuators, such as blade pitch drives to individually pitch each of the blades 22, a yaw system to yaw the wind turbine rotor 18 with respect to the tower 15, or an electronic power converter to control the electromagnetic torque in the drive train of the wind turbine 10. In an example of the method 100, controlling the wind turbine in block 150 may comprise sending command to one or more of said actuators (or to other actuators) during wind turbine operation.

In an example of the disclosure, receiving operational data in block 110 may comprise receiving a time series of operational data. Such time series may be enough to cover multiple periods of the oscillations in the wind turbine rotor 18. Such time series may then be processed to obtain corresponding time series of the first and second signals, from which the amplitude and the phase can be derived. If multiple periods of oscillations are corrected, the first and second signals may correspond to e.g. average, mean or median values for amplitude, and an average, mean or median value of the phase offset.

Figure 4:
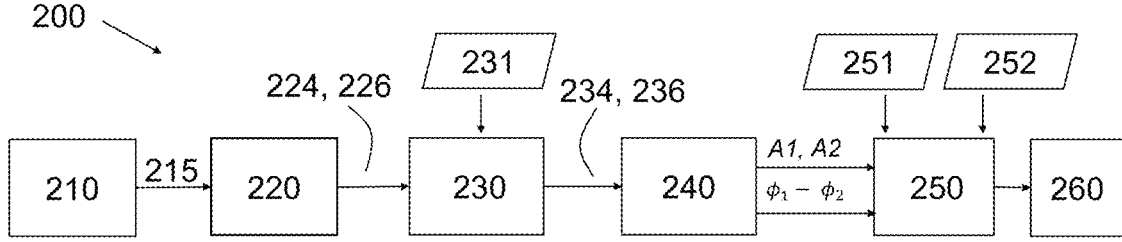
FIG. 4 schematically illustrates a process for controlling a wind turbine based on wind turbine rotor oscillations according to an example.

FIG. 4 schematically illustrates a process 200 for controlling operation of a wind turbine 10 according to an example. In particular, the example depicted in FIG. 4 incorporates different optional steps which will be described below. It is to be understood that, even if said optional steps are all included in the process 200 depicted in FIG. 4, alternative variants or examples may be envisaged in which only one or some of those optional steps may be practiced.

The process 200 illustrated in FIG. 4 includes a sensing system 210, which may be used to obtain operational data 215 indicative of oscillations in a wind turbine rotor 18. As mentioned above, different types of sensors may be provided to measure deformations, moments, accelerations, etc. The sensors may include accelerometers, strain gauges, indicative of local movements, stresses and deformations, but may also include voltage, or current sensors at the generator or power converter. Filters may be applied to the signals as well, as explained hereinafter. Furthermore, even if operational data 215 refers to the wind turbine rotor 18, the arrangement of the sensing system 210 does not need to be in the wind turbine rotor 18 itself. Thus, as shown in more detail below, the sensing system 210 may be arranged in the nacelle 16, e.g. in the main shaft 44, or in the tower 15.

In an example, the method 100 for controlling operation of a wind turbine 10 may comprise converting the received operational data 215 from a rotating reference frame to a non-rotating reference frame, or from a non-rotating reference frame to a rotating reference frame. To this end, a transformation block 220 may be provided in the process 200 as schematically depicted in FIG. 4.

The rotation of the received operational data 215 may result in the derived first 224 and second 226 signals. In other examples not comprising such conversion, the first 224 and second 226 signals may simply correspond to a selection among the received operational data 215 with no further conversion being involved. In still other variants, the derived first 224 and second 226 signals may be obtained after some other type of conversion, i.e. not after a rotations of the reference frame.

Rotation of the operational data 215 may be used to better identify certain oscillation modes. In particular, by shifting from one system of reference to another, dependency of the frequency on the rotation of the wind turbine rotor is minimized. As an example, when acquiring data with a non-rotating sensing system 210, e.g. a sensing system 210 arranged somewhere in the nacelle 16 or in the tower 15, certain frequency components are affected by the rotation of the wind turbine rotor 18. In the non-rotating frame, frequency components are affected by e.g. 1P, i.e. a frequency corresponding to the rotational speed of the wind turbine rotor 18, or any of its multiples (2P, 3P, etc.).

In another example of the present disclosure, the first 224 signal and the second 226 signal may be filtered with a bandpass filter 230 before determining the respective amplitudes and the phase offset. The bandpass filter 230 may be tuned at a frequency 231 corresponding to a wind turbine rotor 18 oscillation mode.

As shown in FIG. 4, in case of transforming the operational data 215 to obtain the first 224 and the second 226 signal, the bandpass filter 230 may be applied to such converted signals 224, 226. As already mentioned, it is understood that the presence of these blocks is optional. Accordingly, in some cases, the first 224 and second 226 signals may not require such conversion and they may be directly extracted from the operational data 225. In any case, the frequency information on the signals 224, 226 may be characteristic of the oscillations propagating in the wind turbine rotor 18.

Simulation and/or other design tools may be employed to predefine the frequency (or frequencies) of the most relevant wind turbine rotor oscillation modes. Accordingly, a more focused process 200 may be carried out. In particular, the bandpass filter 230 may allow focusing the processing on those modes that more significantly jeopardize the integrity of the wind turbine 10 or for which the correct identification is advantageous. In some variants, multiple wind turbine rotor 18 oscillation modes may be of interest. Accordingly, a filter with multiple bands, centered at different frequencies 231, may be provided. Alternatively, the process 200 may be split into multiple parallel paths, each of them configured to handle a specific wind turbine rotor oscillation mode with a specific frequency 231. After passing through the bandpass filter 230, filtered first 234 and second 236 signals may be obtained.

As also schematically depicted in FIG. 4, in an example of the disclosure, determining the amplitude of the first and second signals 224, 226 (or of their filtered versions 232, 236) and the phase offset between the first and second signals 224, 226 (or between their filtered versions 234, 236), may comprise carrying out a sine wave reconstruction of the first and the second signals 222, 226 (or filtered first and second signals 234, 236). A sine wave reconstruction block 240 may be added to the process 200 to implement such reconstruction.

Indeed, time series of operational data 215 may be obtained with the sensing system 210. The sampling rate and the duration of the series may be enough to allow the extraction of sinusoidal parameters, e.g. amplitude and phase, from the signals 224, 226. Nevertheless, in order to properly determine those parameters, a sine wave may be built or reconstructed from the obtained data.

In principle, three unique measurements over an oscillation period may be enough to reconstruct a sine wave. In such case, a simple equation system with three equations and three unknowns may be easily solved to reconstruct the sine wave. Nevertheless, during real-time application of the method 100, a higher sampling rate may be preferred. Thus, multiple timestamps may be acquired per each period of the wind turbine rotor oscillations and operational data 215 may expand over multiple periods. Subsequently, in order to extract or reconstruct the sine wave function, the sine wave reconstruction block 240 may implement a least square sine wave reconstruction to obtain amplitude A1, A2 and phase values $\phi_1$, $\phi_2$ for each of the signals 224, 226 (or filtered signals 234, 236) in an online manner.

Apart from determining the amplitudes and the phase offset, in an example of the method 100, thresholds 251 may be predefined for the determined amplitudes A1, A2 and a band 252 may be predefined for the determined phase offset: $\phi_1$-$\phi_2$. The method 100 according to this example may further comprise identifying a wind turbine rotor 18 oscillation mode based on a comparison between the determined amplitudes A1, A2 and the predefined thresholds 251, and on a comparison between the determined phase offset $\phi_1$-$\phi_2$ and the predefined offset band 252. To this end, a comparator block 250 may be provided in the process 200 as shown in FIG. 4.

Amplitudes A1 and A2 may respectively correspond to the first signal 224 (234) and to the second signal 226 (236). Similarly, $\phi_1$ may correspond to the phase of the first signal 224, whereas $\phi_2$ may correspond to the phase of the second signal 226.

By comparing the determined amplitudes A1, A2 with certain thresholds 251, the presence of a relevant oscillation building up in the wind turbine rotor 18 may be determined. Furthermore, by combining this comparison with the band-pass filter 230, the presence of an oscillation, of certain magnitude, and at a certain frequency, may be detected.

Besides, inventors have found that additional relevant information can be obtained from the analysis of the phase offset $\phi_1$-$\phi_2$ between the two signals 224, 226. Thus, different wind turbine rotor oscillation modes may result in oscillations at similar frequencies. It may be difficult to distinguish one from the other. But, by taking into account the phase information of the signals, and more particularly, the phase offset or difference between the phase of the two signals, a more accurate identification of the dominant oscillation mode can be obtained. Subsequently, a more focused control of the wind turbine 10 may be carried out. Indeed, in an example of the present disclosure, the method 100 may comprise controlling the wind turbine 10 at least partially on the basis of the identified wind turbine rotor oscillation mode.

In other words, different control actions may be taken depending on the dominant rotor mode. Specifically, it is known that not all vibrations are equally dangerous to the wind turbine 10, so that different reactions may be beneficial even if similar amplitudes are detected. Accordingly, the use of the phase offset information, together with the amplitude information, may reduce the number of false positives.

In an example of the disclosure comprising the definition of thresholds 251 for the determined amplitudes, different thresholds 251 may be predefined for different wind turbine rotor oscillation modes.

The definition of specific thresholds 251 for the amplitude for different wind turbine rotor modes may also improve the controllability of the wind turbine 10. As indicated in the previous paragraphs, the identification of the wind turbine rotor modes may allow for an optimized control response. As a further aspect to handle different oscillation modes individually, the detection of the rotor mode itself may be conditional on the definition of the threshold 251 value.

As an example, a low threshold value for the amplitude of the signal may be predefined for a particularly relevant or dangerous rotor oscillation mode. Accordingly, such mode may be detected as it starts building up, i.e. at an early stage, or even if the overall vibration does not exhibit a very noticeable amplitude. On the contrary, a relatively high threshold value may be predefined for less dangerous oscillation modes. Accordingly, vibration for such rotor modes may be allow to occur and may remain substantially undetected until the amplitude reaches a certain, higher, value, for which the presence of such less dangerous oscillation mode may also become relevant.

In other words, in an example of the disclosure, the sensitivity of the method 100 may be individually selected for specific wind turbine rotor oscillation modes by individually adjusting the value of the thresholds 251.

In other examples of the disclosure, the width of the phase offset band 252 may also be adjusted. Accordingly, a thinner phase offset band 252 may be selected to enable detection and identification of a mode with high accuracy, whereas a wider phase offset band 252 may be preferred to permit a less specific identification. In particular, manufacturing tolerances of the wind turbine components may affect the actual normal frequencies of the oscillation modes. A wider phase offset band 252 may be preferred to mitigate such effects so as to detect relevant oscillation modes even if slightly shifted from their theoretically expected frequencies. Referring back to FIG. 4, the thresholds 251 and the phase offset band 252 may be defined as vectors, i.e. as combinations of amplitude thresholds and phase offset bands. Different such combinations may be employed for different wind turbine rotor modes and, more particularly, for backward or forward whirl modes.

As shown in FIG. 4, the process 200 may comprise a control block 260. The control block 260 may be configured to carry out different control actions in different examples of the disclosure.

Hence, in an example of the disclosure, controlling the wind turbine 10 at least partially based on the determined amplitudes A1, A2 and the determined phase offset $\phi_1$-$\phi_2$ may comprise generating an alarm if a predetermined wind turbine rotor oscillation mode is identified. The generation of an alarm may be used to keep a record of the number of events over a certain period during the lifetime of the wind turbine 10. Thus, apart from controlling the wind turbine 10, the generation of an alarm may allow a statistical analysis of the performance, which may be used to assess the fatigue of the wind turbine 10. Otherwise, the alarm may be used to enable a remote action by an operator. Such remote action may comprise stopping of a complete wind farm of reporting of the alarm to maintenance personnel.

In another example, controlling the wind turbine 10 based at least partially on the determined amplitudes A1, A2 and the determined phase offset $\phi_1$-$\phi_2$ may comprise stopping the wind turbine 10 if a predetermined wind turbine rotor 18 oscillation mode is identified.

Although obviously not preferred, certain events may require a drastic action to prevent undesired effects on the wind turbine 10. Thus, identification of particularly dangerous rotor oscillation modes at high amplitudes, may require stopping of the wind turbine, especially in cases when no other control action can be implemented to mitigate the excitation.

In this manner, even if energy yield may be negatively impacted in the short-term, serious damage, e.g. structural damage of the blades, may be avoided, thus improving the long term performance of the wind turbine 10.

In still another example, controlling the wind turbine 10 based at least partially on the determined amplitudes A1, A2 and the determined phase offset $\phi_1$-$\phi_2$ may comprise adjusting an operating point of the wind turbine 10. Specifically, the wind turbine 10 may be in an operating state, i.e. it may be generating power, and the operation point may be adjusted while continuing operation. The adjusted operating point may be configured to mitigate further excitation of an identified wind turbine rotor oscillation mode.

According to this example, the operating point of the wind turbine 10 may be adjusted in real time. The operating point of the wind turbine 10 may be characterized by a rotational speed of the wind turbine rotor 18 and by an electromagnetic torque. The combination of rotational speed and torque may give place to a certain generated power.

In some examples, adjusting the operating point may comprise reducing the generated power by reducing the rotational speed and/or the electromagnetic torque. Such reduction may be accomplished by controlling, e.g. the pitch angle of the wind turbine blades 22 with the corresponding pitch systems 68, or by adjusting the electromagnetic torque of the drive train by controlling the electronic converter.

In some further examples, adjusting the operating point may comprise changing the rotational speed and the electromagnetic torque of the drive train in a coordinated manner, such that the generated power is kept substantially constant. In particular, in case of a small reduction in the rotational speed, this may be compensated by slightly increasing the electromagnetic torque. Accordingly, the product between both magnitudes may remain substantially constant.

In an example, upon changing the operating point of the wind turbine 10, the method 100 may be repeated continuously so as to monitor the evolution of the detected oscillation. A control strategy may be designed to effectively mitigate further excitation of the detected rotor oscillation and, consequently, to reduce the corresponding amplitudes. In cases when such reduction is not effectively observed, the wind turbine 10 may be subsequentially stopped and further corrective actions may be carried out.

In some additional examples, the information from the amplitudes and from the phase offset may be combined. Thus, the comparator block 250 may be configured such that, if very high amplitudes A1, A2 are determined, an action is triggered in block 260 even if the phase offset is still moving over a relatively broad band. On the contrary, a more refined detection may be preferred in some other cases. Hence, a narrow phase offset band may be implemented for certain modes such that, even if the amplitudes A1, A2 are relatively low, an action is triggered.

Different wind turbine rotor oscillation modes may be addressed by the present disclosure. Hence, in an example of the disclosure, the wind turbine rotor oscillation modes may comprise non-collective whirl modes.

Non-collective whirl modes may become particularly dangerous for a wind turbine 10. In particular, non-collective modes arise when the multiple blades 22 of the wind turbine rotor 18 oscillate in an asynchronous manner, i.e. the blades 22 oscillate independently from each other. Whirl modes can be observed in which the wind turbine rotor 18 undergoes a precessional motion around the rotational axis of the wind turbine 10, thus creates a wobbling effect. Consequently, the center of mass of the wind turbine rotor 18 is not fixed at the location of the rotor axis 30 but follows a circular or elliptical path.

Different variants may be envisaged concerning different types of whirl modes. In some examples, flapwise whirl modes of the wind turbine rotor 18 may be considered. In other examples, the non-collective whirl modes may comprise edgewise whirl modes. Furthermore, the determined phase offset may be used to classify the modes as forward whirl modes or backward whirl modes.

Edgewise non-collective whirl modes may become particularly relevant as they exhibit less damping that flapwise modes. Consequently, the detection and identification of such modes may become particularly relevant, so that the adequate control actions may be implemented.

Furthermore, whirl modes are split into forward and backward whirl modes. Forward and backward whirl modes can be identified by means of the phase offset between the two signals 224, 226. As an example, whirl modes have a phase offset of +/−90° between D and Q moments for forward and backward whirl modes respectively. Thus, the D and Q moments may be sensed with an adequate system (see FIG. 7 below) and they may correspond to the first 224 and second 226 signals shown in FIG. 4. Accordingly, the amplitudes of such D and Q moments may be compared with a threshold 251 and the phase offset between the respective phases may be compared with either +90° or −90°, which may be selected in the phase offset block 252, to distinguish between forward and backward modes.

In an example of the method 100 comprising whirl modes, different thresholds may be predefined for forward edgewise whirl modes and for backward edgewise whirl modes. According to this example, a more appropriate control response may be provided to the identified mode. Thus, it is known that backward whirl modes may have a more significant impact than forward whirl modes in fatigue loads. Accordingly, a lower threshold may be defined, in threshold block 251, for the detection of a backward whirl mode. In this manner, such whirl mode may be identified at an early stage during build up so as to mitigate subsequent damaging effects.

Figures 5, 6:
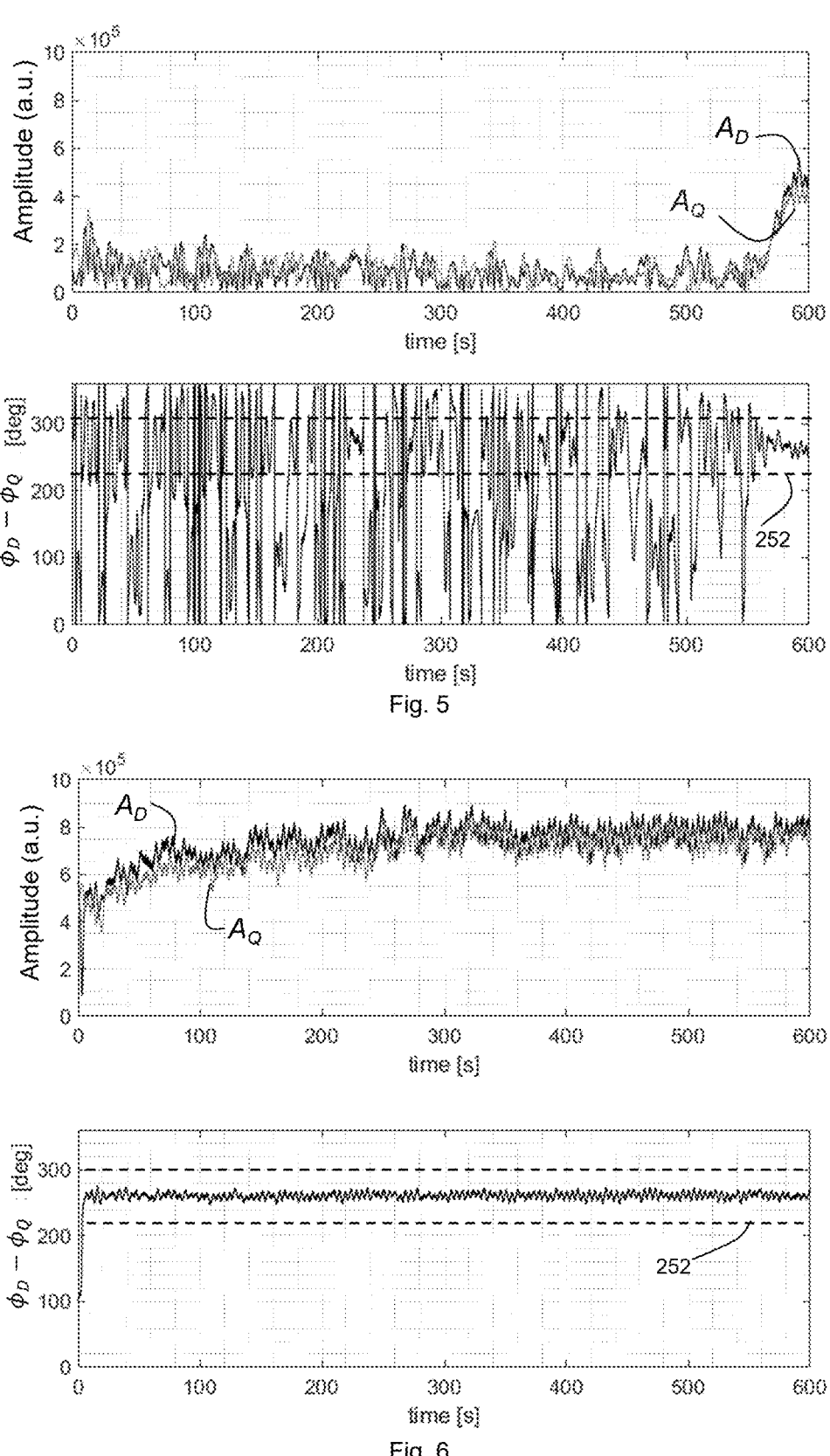
FIG. 5 schematically illustrates an example of a first test to identify wind turbine rotor oscillation modes.
FIG. 6 schematically illustrates an example of a second test to identify wind turbine rotor oscillation modes.

FIGS. 5 and 6 provide different examples of field tests conducted to identify whirl modes. In particular, FIG. 5 shows a 10-minute time series of two signals derived from operational data 215. In this example, the first 224 and second 226 derived signals correspond to the D and Q components, which are orthogonal to each other as known by those skilled in the art, of the moment experienced at the main shaft 44 of the wind turbine 10. Such moments may be derived from operational data obtained with a sensing system like the one schematically depicted in FIG. 7, which will be described below.

The above graph in FIG. 5 shows the determined amplitudes for each of the first and second signals $A_D$, $A_Q$, whereas the bottom figure depicts the phase offset $\phi_D$-$\phi_Q$ between both signals. Furthermore, in this example, the signals received from the sensing system were transformed from a non-rotating frame to a rotating frame in a conversion block (i.e. like block 220 in FIG. 4) and the resulting rotated signals were filtered by means of a band-pass filter (i.e. like filter 230 in FIG. 4). In order to transform the signals, azimuth information, i.e. information on the rotor position, is also employed. The band-pass filter 230 in this field test was adjusted to the known frequency of the relevant whirl modes.

As shown in FIG. 5, a whirl mode is established towards the end of the 10 minute series, i.e. after approximately 560 seconds. The establishment of such mode can be observed by the significant increase in the amplitudes $A_D$, $A_Q$. Furthermore, the phase offset $\phi_D$-$\phi_Q$ converges from a mostly randomly changing value to a fixed value. In particular, the phase offset converges to a value in the range of 270° (or −90°). This information, together with the predefined frequency, can be used to identify (i.e. not only detect) the wind turbine rotor oscillation mode. Thus, referring back to FIG. 4, the comparator 250 may be used to analyze the amplitudes and the phase offset and to compare them with appropriate thresholds 251 and offset bands 252.

In this example, such phase offset (270°) indicates that the established mode is a backward edgewise whirl mode. This information can then be used by a control block (like 260 in FIG. 4) to implement the most adequate control action.

FIG. 6 is similar to FIG. 5 and it also shows the results obtained in a field test. The same process as the one described with reference to FIG. 5 was followed, i.e., a process comprising rotation and filtering of obtained operational data. In this case, the whirl mode is already established so the results depict a pure whirl mode. Accordingly, the amplitudes $A_D$, $A_Q$ exhibit high values and the phase offset $\phi_D$-$\phi_Q$ remains in the range of 270° for the whole duration of the test, i.e. for the 600 seconds.

According to another aspect of the disclosure, a control unit 36 for controlling operation of a wind turbine 10 is provided. The control unit 36 is configured for receiving operational data indicative of oscillations in a wind turbine rotor 18. The control unit 36 is further configured for deriving, from the operational data indicative of oscillations in the wind turbine rotor, a first signal representative of loads in a first direction in a reference plane and a second signal representative of loads in a second direction in the reference plane. The second direction is different from the first direction and the reference plane substantially corresponds to a wind turbine rotor 18 plane or is substantially parallel to the wind turbine rotor 18 plane. The control unit 36 is also configured for determining an amplitude of the first and the second signals as well as for determining a phase offset between the first and the second signals. Finally, the control unit 36 is configured for controlling the wind turbine based at least partially on the determined amplitudes and the determined phase offset.

The control unit 36 may be arranged in a wind turbine 10, either as a new control unit 36 in a newly manufactured wind turbine 10, or as a retrofit in an already existing wind turbine 10. Furthermore, the functionality described with reference to FIGS. 3 and 4 may also be uploaded in an already existing control unit 36 of an already installed wind turbine 10.

The control unit 36 may comprise the hardware needed to run a method 100 for controlling a wind turbine 10. Consequently, the control unit 36 allows the practical exploitation of the already described advantages.

According to still a further aspect of the disclosure, a wind turbine 10 is provided. The wind turbine 10 comprises a wind turbine rotor 18, one or more sensors 210 to detect operational data indicative of oscillation in the wind turbine rotor 18, an electrical generator 42, and a control unit 36 for controlling the wind turbine 10. The control unit 36 is configured for receiving operational data indicative of oscillations in a wind turbine rotor 18. The control unit 36 is further configured for deriving, from the operational data indicative of oscillations in the wind turbine rotor, a first signal representative of loads in a first direction in a reference plane and a second signal representative of loads in a second direction in the reference plane. The second direction is different from the first direction and the reference plane substantially corresponds to a wind turbine rotor 18 plane or is substantially parallel to the wind turbine rotor 18 plane. The control unit 36 is also configured for determining an amplitude of the first and the second signals as well as for determining a phase offset between the first and the second signals. Finally, the control unit 36 is configured for controlling the wind turbine based at least partially on the determined amplitudes and the determined phase offset.

In an example, the wind turbine 10 may comprise a shaft 44 for operatively coupling the wind turbine rotor 18 to the electrical generator 42. The sensors 210 to detect operational data indicative of oscillations in the wind turbine rotor 18 may comprise one or more sensors for detecting asymmetric loading acting on the shaft 44.

Loads acting on the wind turbine rotor 18 and inducing wind turbine rotor oscillations may produce asymmetric loading across the wind turbine rotor 18. The resultant loads may produce bending moments in the blades 22 which may be reacted by the hub 20 and, subsequently, by the shaft 44. Consequently, detection of loads on the shaft 44 may provide information on the oscillations suffered on the wind turbine rotor 18 in a highly convenient manner.

Figure 7:
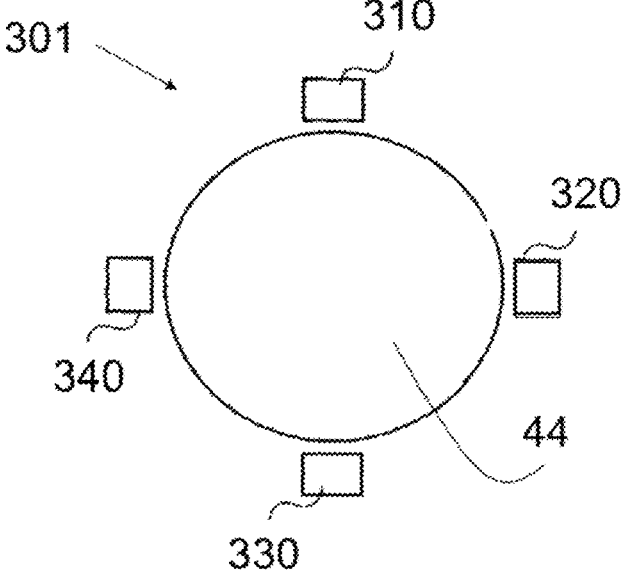
FIG. 7 schematically illustrates an end view of a wind turbine shaft and a sensing system to detect operational data indicative of oscillation in the wind turbine rotor according to an example.

As an example, FIG. 7 depicts an example of a sensing system 301 for detecting asymmetric loading acting on the shaft 44. The sensors 310-340 may comprise two proximity sensors 310, 320, facing the shaft 44, and being approximately 90° apart with respect to an axis of the shaft 44. Such arrangement may permit a convenient evaluation of the loads suffered by the shaft 44. Furthermore, proximity sensors 310, 320 may be used to derive other magnitudes, such as moments acting on the shaft 44. In particular, by arranging a plurality of sensors 310-340, distributed as shown in FIG. 7, the D and Q components of the moment in a plane substantially parallel to the plane of the wind turbine rotor 18 may be obtained. In other examples, different types of sensors may be used such as, e.g. strain gauges attached on the surface of the shaft 44.

In an example of the disclosure, the first and second signals derived by the control unit 36 may correspond to a transformation of the operational data generated by the sensors 310-340 to a rotating frame associated with a rotation of the wind turbine rotor 18.

In particular, in an example of the disclosure, the operational data 215 may comprise the D and Q moments as determined by a sensing system 210 like the one depicted in FIG. 7. The azimuth angle of the wind turbine rotor 18 may also be captured. Such information may be obtained in real-time and it may be used by a transformation block 220 to derive D and Q moments in a rotating frame and, more particularly, in a rotating frame rotating with the wind turbine rotor 18. In this manner, an improved characterization of the oscillations propagating over the wind turbine rotor 18 may be achieved.

FIG. 7 depicts just one 301 of multiple different sensing systems that may be used to sense operational data 215 indicative of oscillations in the wind turbine rotor 18. Thus, in other examples of the disclosure, the wind turbine rotor 18 may comprise a plurality of blades 22 and the wind turbine 10 may comprise one or more sensors arranged at the blades 22. The sensors may be configured for measuring loads on the blades 22, the measured loads corresponding to the operational data received by the control unit 36. In particular, wind turbines 10 may already comprise a plurality of sensors arranged at the blade root of each blade 22 to control, e.g. blade root moments. Accordingly, such information may also be employed for the purpose of the present disclosure.

In still a further example, the wind turbine rotor 18 may comprise a plurality of blades 22. A pitch drive system 68 with a pitch motor 74 may be operatively coupled to each blade 22 for modulating a pitch angle of the corresponding blade 22. The wind turbine may further comprise one or more sensors arranged at the pitch motors 74. The sensors may be configured for measuring electrical quantities. Such electrical quantities may correspond to the operational data received by the control unit 36. In particular, electrical current of the pitch motors may correlate with rotor oscillation modes due to the varying torque needed to maintain a certain pitch angle in the presence of rotor oscillations.

It is understood that the different sensing systems are not exclusive and they may be combined. Furthermore, other sensing system, which are known to the skilled person, may be used to detect operational data indicative of oscillations in the wind turbine rotor 18.

This written description uses examples to disclose the teaching, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various examples described, as well as other known equivalents for each such aspects, can be mixed and matched by one of ordinary skill in the art to construct additional examples and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method of controlling operation of a wind turbine, the method comprising:
   receiving operational data indicative of oscillations in a wind turbine rotor;
   from the operational data, deriving a first signal representative of first loads acting in a first direction in a reference plane corresponding to or parallel to a rotational plane of the wind turbine rotor;
   from the operational data, deriving a second signal representative of second loads different from the first loads acting in a second direction in the reference plane that is different from the first direction;
   determining an amplitude of each of the first and second signals;
   determining a phase offset between the first and second signals; and
   controlling the wind turbine based at least partially based on the determined amplitudes and the determined phase offset.

2. The method of claim 1, wherein received operational data is converted from a rotating reference frame to a non-rotating reference frame, or from a non-rotating reference frame to a rotating reference frame.

3. The method of claim 1, wherein the first signal and the second signal are filtered with a bandpass filter before determining the respective amplitudes of the first signal and the second signal and the phase offset, the bandpass filter tuned at a frequency corresponding to a wind turbine rotor oscillation mode.

4. The method of claim 1, wherein determining the amplitudes of the first and second signals and the phase offset between the first and second signals, comprises carrying out a sine wave reconstruction of the first and the second signals.

5. A control unit for controlling operation of a wind turbine, the control unit configured to perform the method according to claim 1.

6. A wind turbine, comprising:
   one or more sensors configured to detect operational data indicative of oscillations in the wind turbine rotor;
   an electrical generator; and
   a control unit configured to control operation of the wind turbine according to the method of claim 1.

7. The wind turbine of claim 6, further comprising a shaft operatively coupling the wind turbine rotor to the electrical generator, wherein the one or more sensors are disposed to detect the operational data by detecting asymmetric loading acting of the shaft.

8. The wind turbine of claim 7, wherein the one or more sensors comprise two proximity sensors facing the shaft and being essentially 90° apart with respect to an axis of the shaft, and further wherein the first and second signals derived by the control unit correspond to a transformation of the operational data generated by the one or more sensors to a rotating reference frame associated with a rotation of the wind turbine rotor.

9. A method of controlling operation of a wind turbine, the method comprising:
   receiving operational data indicative of oscillations in a wind turbine rotor;
   from the operational data, deriving a first signal representative of first loads acting in a first direction in a reference plane corresponding to or parallel to a rotational plane of the wind turbine rotor;
   from the operational data, deriving a second signal representative of second loads different from the first loads acting in a second direction in the reference plane that is different from the first direction;
   determining an amplitude of each of the first and second signals;
   determining a phase offset between the first and second signals;
   controlling the wind turbine based at least partially based on the determined amplitudes and the determined phase offset; and
   wherein amplitude thresholds are predefined for the determined amplitudes and a band is predefined for the determined phase offset, the method further comprising identifying a wind turbine rotor oscillation mode based on a comparison between the determined amplitudes and the predefined amplitude thresholds, and on a comparison between the determined phase offset and the band.

10. The method of claim 9, wherein controlling the wind turbine comprises controlling the wind turbine based at least partially on the identified wind turbine rotor oscillation mode.

11. The method of claim 10, wherein different threshold values are predefined for the amplitude thresholds of different wind turbine rotor oscillation modes.

12. The method of claim 10, wherein controlling the wind turbine comprises stopping the wind turbine when a predetermined wind turbine rotor oscillation mode is identified.

13. The method of claim 10, wherein controlling the wind turbine comprises adjusting an operating point of the wind turbine to mitigate further excitation of the identified wind turbine rotor oscillation mode.

14. The method of claim 9, wherein the wind turbine rotor oscillation modes are non-collective whirl modes.

15. The method of claim 14, wherein the non-collective whirl modes are edgewise whirl modes, and the determined phase offset is used to classify the edgewise whirl modes as forward whirl modes or as backward whirl modes.

* * * * *